March 15, 1960 E. P. WIGNER ET AL 2,928,781
COOLED NEUTRONIC REACTOR
Filed June 12, 1952 4 Sheets-Sheet 3

INVENTORS.
Eugene P. Wigner
Edward C. Creutz
By: Roland A. Anderson
Attorney.

March 15, 1960 E. P. WIGNER ET AL 2,928,781
COOLED NEUTRONIC REACTOR
Filed June 12, 1952

INVENTORS.
Eugene P. Wigner
Edward C. Creutz
By Roland A. Anderson
Attorney

United States Patent Office 2,928,781
Patented Mar. 15, 1960

2,928,781
COOLED NEUTRONIC REACTOR

Eugene P. Wigner, Princeton, N.J., and Edward C. Creutz, Pittsburgh, Pa., assignors to the United States of America as represented by the United States Atomic Energy Commission Application June 12, 1952, Serial No. 293,104

1 Claim. (Cl. 204—193.2)

The present invention relates generally to neutronic reactors, and more specifically to methods and apparatus for cooling neutronic reactors.

It is well known, that the absorption of a neutron by an atom of fissionable material may result in the splitting of the fissionable atom and the liberation of a number of neutrons and considerable energy. Neutronic chain reactors operate by virtue of the fact that more neutrons are liberated by the fissioning of atoms in a chain reacting system than are lost to the reaction by diffusion and absorption of neutrons. The energy liberated by the fission process appears in the form of fission fragments, particles, and radiations. The fission fragments, particles, and a portion of the radiations, are absorbed within the structure of the neutronic reactor, thereby liberating large quantities of heat. It thus becomes necessary to cool the structure of a neutronic reactor in order to prevent melting of solid materials, the increasing of oxidation rates, and other undesirable effects within the reactor structure.

Not all of the cooling agents known to the art are suitable for cooling a neutron reactor. In addition to the usual properties required of cooling agents, a neutronic reactor coolant must possess nuclear properties which will not present too deleterious an effect upon the neutronic chain reaction. This, in general, means that a neutronic reactor coolant must have a small neutron capture cross section as well as favorable thermal properties, since neutrons absorbed in the coolant will be lost to the neutronic chain reaction. This requirement generally dictates a reactor design utilizing a minimum volume of the coolant within the reactor for heat removal. A good coolant for a neutronic reactor should be highly stable from the point of view of both thermal properties and nuclear properties, since changes in these properties of a coolant will effect the reactivity of a neutronic reactor. The coolant should also produce very limited corrosion, and require a minimum power consumption for circulating the coolant throughout the reactor. A number of materials have been used as coolants in neutronic reactors, among these air, water, and heavy water have proven to be most readily adapted to the coolant processes used in reactors in which neutrons, primarily of thermal energy produce fission. Other coolants, such as potassium and sodium potassium alloys, as well as the coolants mentioned, may be used in reactors operating with neutrons of higher energies. The necessary criteria for a coolant material has been widely discussed in the art, the patent of Enrico Fermi and Leo Szilard, Serial No. 568,904, filed December 19, 1944, now Patent No. 2,708,656, being an example.

The existing reactors have generally utilized ducts extending through the active portion of a neutronic reactor and forced the coolant through the ducts from one end to the other. As a result, the lowest temperature of the coolant in the reactor occurs at the intake end of the duct, and the highest temperature at the outlet end of the duct. It is also true, that the neutron density within a neutronic reactor is greatest at the center of the active portion of the reactor, and hence the greatest proportion of the heat liberated by the reaction occurs in this center portion. Also, the heat removed from any structure by a coolant is proportional to the temperature difference between the structure and the coolant, so that less heat is removed from the region of the reactor adjacent to the exhaust end of the ducts than is removed from the region adjacent to the intake end of the ducts. As a result, such a neutronic reactor will have a central portion operating at a higher temperature than the peripheral portion, and also a poorer transfer of heat from the central region to the coolant than would be obtained if the coolant entering the center of the reactor had not already become quite hot. The present invention is directed to eliminating this difficulty.

The maximum power level to which a neutronic reactor may be operated is generally determined by a limiting maximum temperature within the neutronic reactor structure, although other limiting factors could also determine the maximum power level. In order to obtain maximum cooling, the coolant is generally introduced into the reactor coolant ducts at a high pressure, this pressure decreasing as the coolant traverses through the reactor. The amount of heat carried away by a stream of coolant is a function of the velocity of the coolant. Since the velocity of the coolant is reduced by a pressure drop along a duct, it is desirable to minimize the pressure drop along the length of the coolant duct as the coolant traverses the duct, and the present invention is also directed to this end.

A more complete understanding of the present invention may be had by a further reading of the specification, the invention having been illustrated by means of an air cooled neutronic reactor, although it is to be understood that a water cooled, or other type of neutronic reactor, could also be used to illustrate the present invention. Such an air cooled neutronic reactor is illustrated in the drawings, in which:

Figure 4 is an enlarged vertical sectional view of a fragment of the active portion of the reactor;

Figure 5 is an enlarged fragmentary view of a portion of the active portion of the reactor taken along line 5—5 of Figure 4.

Figure 1:
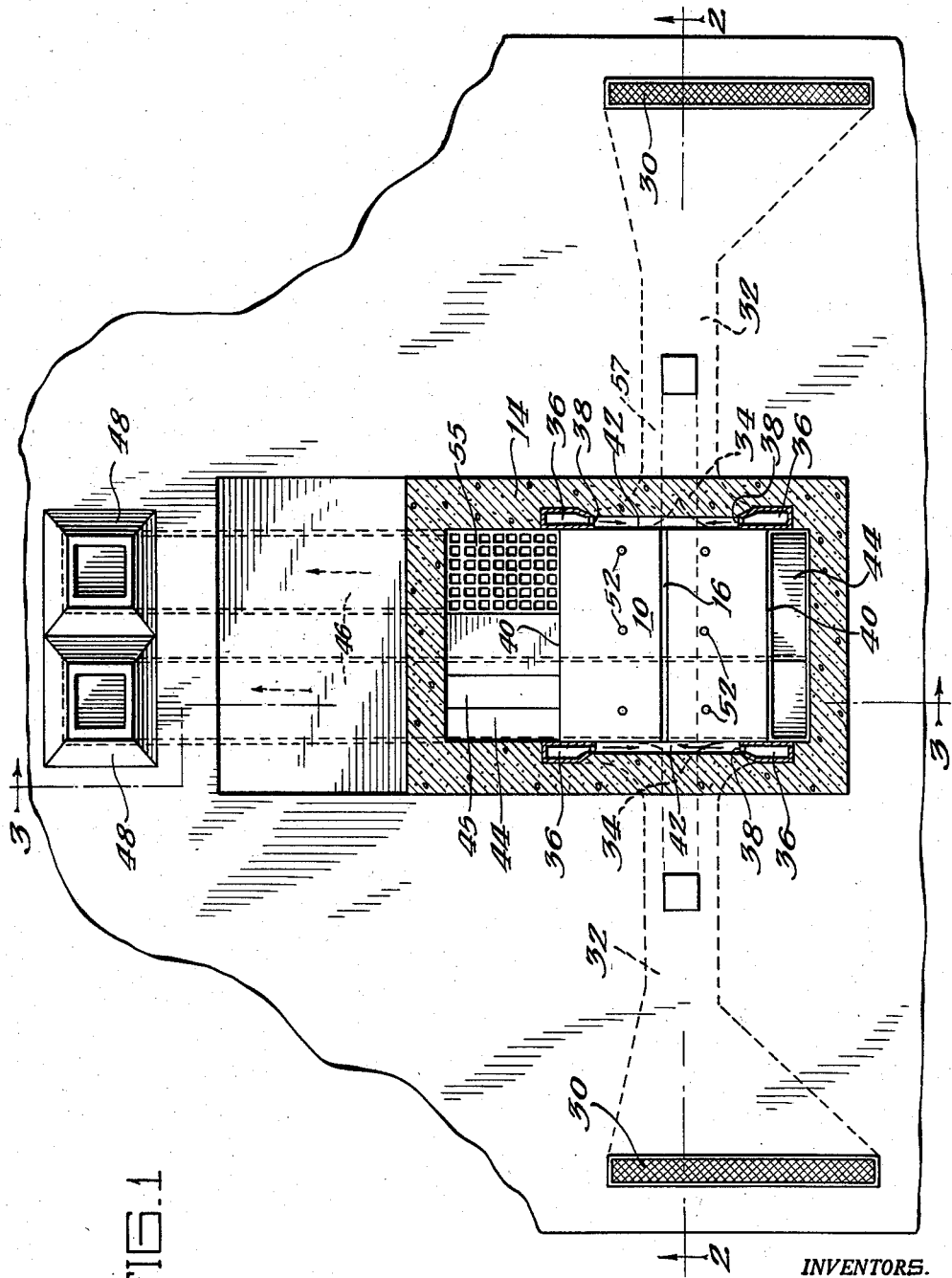
Figure 1 is a plan view, partly in section, of a neutronic reactor embodying the present invention.

The neutronic reactor described in Figures 1 through 5 has an active portion 10 surrounded by a shield 14. The active portion of a reactor may be defined as the region in which the neutron fissionable material is disposed and in which the reaction produced neutrons are generated. The active portion 10 is in the form of a cube, and is provided with a central gap 16 which traverses the active portion 10 in a vertical plane.

In this embodiment of the invention, the active portion 10 consists of a moderator 18 having two portions and forming a cube at least 20 feet on a side with a gap less than 20 centimeters and preferably approximately 7 centimeters, a plurality of coolant channels 20 extending through the moderator 18 normal to the plane of the central gap 16, and fuel elements 22 disposed within the coolant channels 20. The fuel elements 22 have a body 24 of material fissionable by neutrons of thermal energy, such as natural uranium, or isotopically enriched uranium, or plutonium in a suitable diluent. The fissionable body 24 is enclosed within a protective casing 26 which may be constructed of aluminum. The casing 26 is also provided with a plurality of longitudinal fins 28 for supporting the fuel elements 22 in the coolant channels 20.

Figure 2:
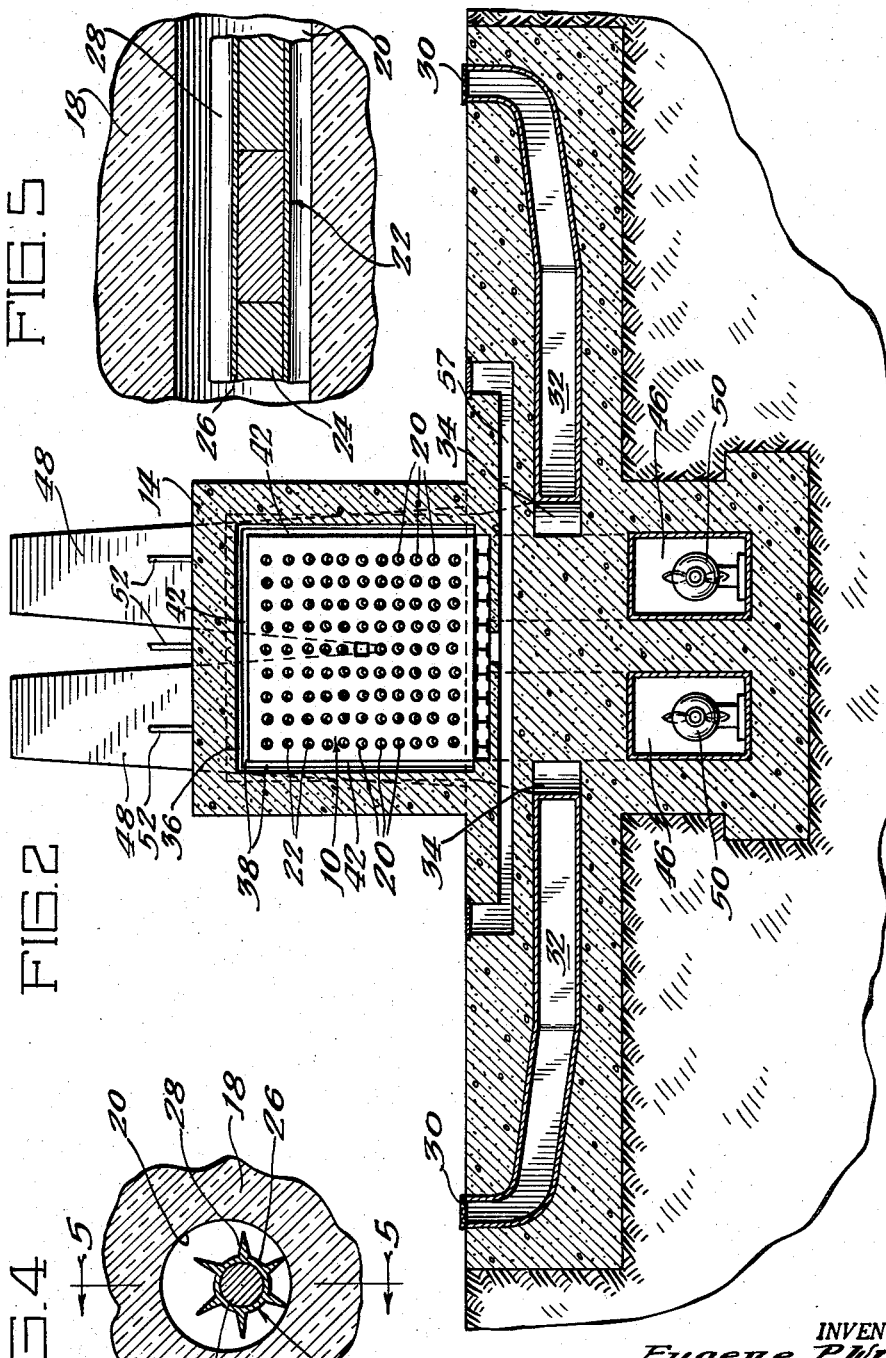
Figure 2 is a sectional view of the neutronic reactor shown in Figure 1 taken along line 2—2 thereof.
Figure 3:
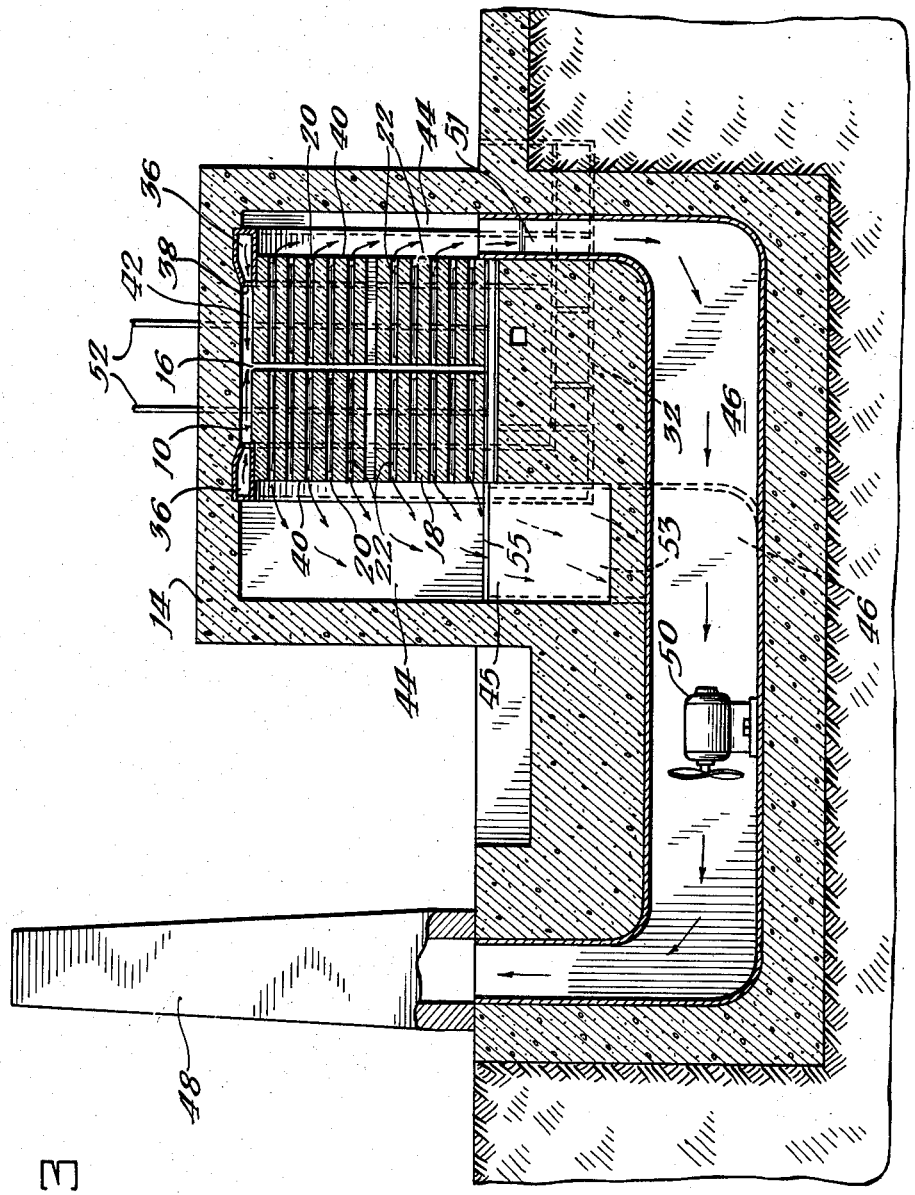
Figure 3 is a vertical sectional view of the reactor taken along line 3—3 of Figure 1.

Air is introduced into the reactor for cooling purposes through filters 30 disposed upon opposite sides of the reactor. The air is transported to the reactor by means of ducts 32 which split into a T-connection 34 adjacent to the sides of the reactor. A manifold 36 is disposed adjacent to the two exhaust faces 40 of the reactor and is attached to the top and sides of the reactor active portion 10. Each of the T-connections 34 connects one of the intake ducts 32 to each of the manifolds 36. The manifolds 36 are provided with a plurality of apertures 38 contiguous to the sides of the active portion 10, but sealed from the exhaust faces 40 of the reactor. The manifolds 36 are imbedded within the concrete shield 14, but an air passage 42 is provided adjacent to the surfaces of the reactor between the apertured sides of the manifolds 36, the passage 42 girdling the active portion 10 of the reactor except for the bottom thereof, as best illustrated in Figures 2 and 3.

Exhaust chambers 44 are disposed adjacent to each of the exhaust faces 40 of the active portion 10 of the reactor. A channel 45 extends downwardly from the floor of one of the exhaust chambers 44, as illustrated in Figures 1 and 2, and may be used to remove irradiated fuel elements 22 from the reactor. Exhaust ducts 46 disposed on a level beneath the active portion 10 of the reactor extend from the exhaust chambers 44 to stacks 48. The exhaust ducts 46 are connected to the exhaust chambers 44 by passages 51 and 53, a grate 55 being disposed at the entrance of passage 53. Exhaust fans 50 are disposed within the exhaust ducts 46 for the purpose of forcing the air through the stacks 48.

The exhaust fans 50, by forcing air from the stacks 48, lower the air pressure in the exhaust ducts 46 and the exhaust chambers 44, thereby drawing air into the coolant system of the reactor through the air filters 30. The coolant air flows from the filters 30 through the intake ducts 32 to the manifolds 36. The air flows from the manifolds 36 across three of the surfaces of the reactor, all of the faces except the exhaust faces 40 and bottom. The air then flows into the central gap 16. At this point the air flow divides, approximately equal portions of air flowing through the coolant channels 20 in each portion of the active portion 10 of the reactor. The coolant air thus flows across the fuel elements 22 within the coolant channels 20 and into the two exhaust chambers 44. From thence the coolant air proceeds down the two exhaust ducts 46 to the stacks 48.

Figure 6:
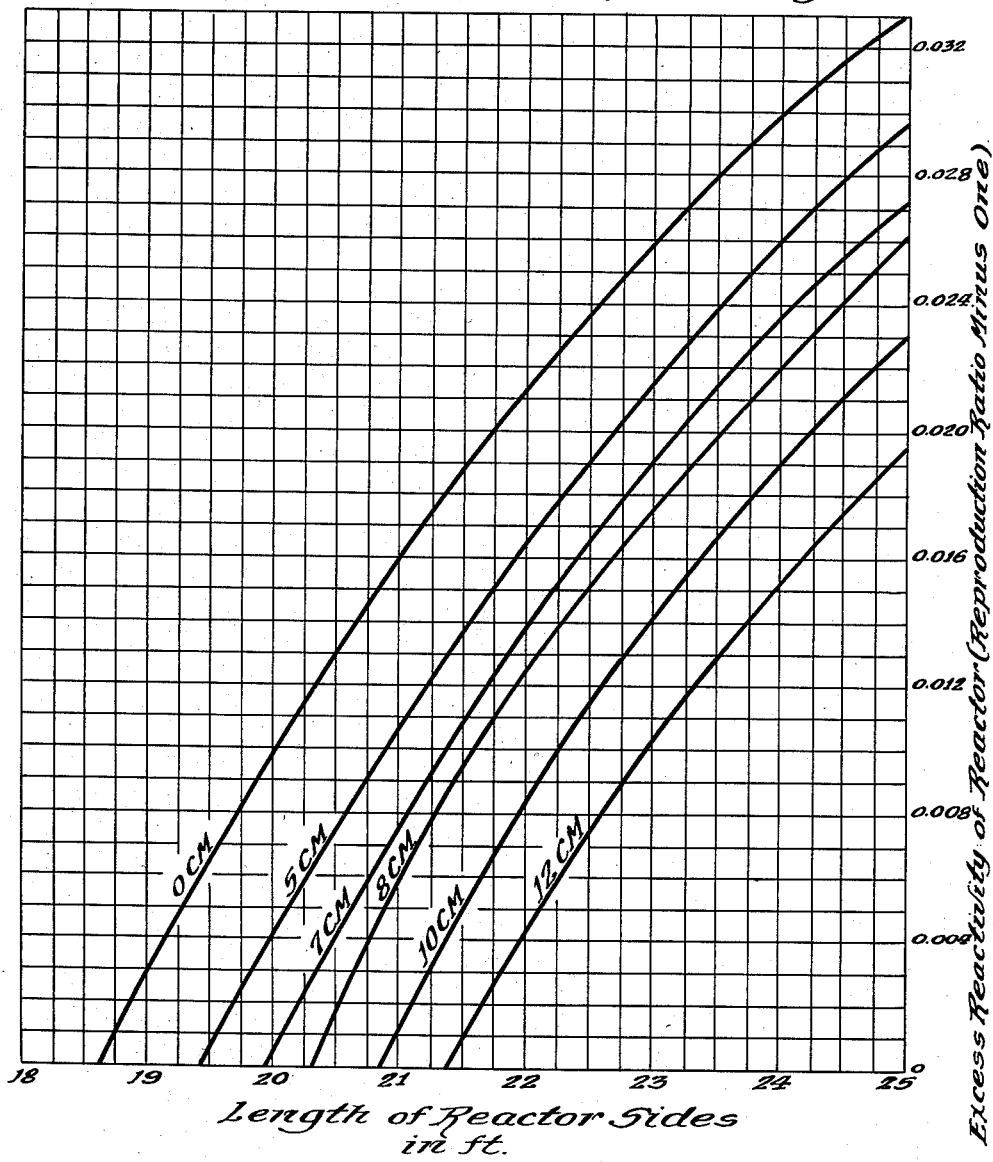
Figure 6 is a graph showing the effect of different gap widths upon the reactivity and critical size of the reactor shown in Figures 1 through 5.

As indicated in Figure 6, the active portion 10 of the reactor is constructed with excess reactivity, so that changes in the nuclear characteristics of the reactor will not reduce the reproduction ratio below unity, and so that the reactor may be used to irradiate non-fissionable objects placed within the active portion 10 of the reactor. The reproduction ratio is the ratio of the number of neutrons in one generation to the number of neutrons in the preceding generation for a given reactor. It is to be noted, that the critical sizes of reactors with the shown gap widths are indicated in Figure 6, since a reactor will be just critical when the excess reproduction ratio vanishes (all reactivity control positioned for maximum reactivity).

A plurality of control rods 52 are positioned within the active portion 10 of the reactor in order to absorb the excess neutrons and reduce the reproduction ratio to unity. These rods 52 are slidably disposed, and may be further inserted into the active portion 10 or withdrawn therefrom the increase or decrease the neutron reproduction ratio of the reactor. The control rods 52 may also be fully inserted into the active portion 10 of the reactor for the purpose of stopping the neutronic chain reaction and shutting down the reactor.

The reactor is provided with access points for irradiating materials. One of these is a duct 57 which extends beneath the active portion 10 of the reactor.

In one particular embodiment of the present invention, the active portion 10 is construced with a graphite moderator 18 to form a cube 25 feet long on each side. The moderator could be constructed of other materials than graphite, any material having suitable chemical and physical properties and a moderating ratio at least as great as that of water being satisfactory, the term moderating ratio being defined by the expression $$\frac{\sigma_s \xi}{\sigma_c}$$

where $\sigma_s$ is the neutron scattering cross section for the material, $\sigma_c$ the neutron capture cross section for the material, and $\xi$ the mean logarithmic energy loss for a collision of a neutron with an atom of the material. The coolant channels 20 are disposed in a rectangular lattice spaced 8 inches from the nearest adjacent channels. The circular area of the coolant channels is 5.6 square inches, and the diameter of natural uranium fissionable bodies 24 disposed within the coolant channels 20 is 1.1 inches. The casing 26 surrounding the bodies 24 of natural uranium is constructed of aluminum, the ratio of the volume of aluminum to the volume of uranium in the reactor active portion 10 being 0.2. The gap 16 at the center of the reactor is 2.75 inches. Thus constructed, it has been found that the 463 coolant channels 20 nearest the center of the active portion 10 of the reactor must be loaded with 37.2 metric tons of uranium in order to make the neutron chain reaction self-sustaining with the control rods 52 totally withdrawn from the active portion 10 of the reactor.

This reactor was also constructed with two types of graphite. The core of the reactor was constructed of 650,000 pounds of the first type of graphite, corresponding to a cube of approximately 18.5 feet on a side, while the remainder of the reactor was constructed of the second type of graphite. The diffusion length for thermal neutrons has been found by test to average 52 centimeters for the first type of graphite and 48 centimeters for the second type of graphite. The thermal neutron diffusion length L is given by the equation $$L^2 = \frac{\overline{r^2}}{6}$$

where $\overline{r^2}$ is the root mean square distance from source point to absorption point for thermal neutrons in the medium. If the entire reactor were constructed of the first type of graphite, the multiplication factor would be 1.074, as contrasted with 1.057 for the same reactor constructed with the second type of graphite due to the differences in the moderating power of the two types of graphite. The multiplication factor is the ratio of the number of neutrons in one generation to the number of neutrons in the preceding generation in a reactor of infinite size with an active portion identical to the reactor in question. These values for the multiplication factor are attained with the reactor operating with a graphite temperature of about 200° C., a maximum uranium temperature within the reactor of approximately 350° C., and a neutron flux at the center of the reactor of approximately $4 \times 10^{12}$ neutrons per square centimeter second.

The uranium used in the fuel elements 22 has the isotopic content found in nature and must be purified to remove ordinary impurities, such as common metals and silica found in the uranium in its natural state, and to reduce the impurities which have high neutron capture cross sections to less than $10^{-6}$ grams per gram of uranium, including such elements as boron, cadmium, indium and some of the rare earths.

Sixteen control rods 52 having square cross sections of 4 square inches each and containing 1.75 percent boron steel have been found to be adequate to control the reactor. While the control rods have been illustrated as entering the reactor vertically, they could equally well be disposed horizontally or diagonally.

The gap 16 which divides the active portion 10 of the reactor permits the coolant air to be introduced into the center of the active portion 10 where the highest temperatures are experienced. Thus, the maximum heat removal occurs at the point of greatest heat generation, and permits the reactor to operate at higher power levels than would be possible if the air coolant were merely flown through the coolant channels 20 from one end to the other end. Also, by introducing the air through the central gap 16, the pressure drop of the coolant air along the channels 20 has been found to be approximately one-fifth as great as it would be in a similarly constructed reactor without the central gap and in which the coolant air would be flown from one end of the channel to the other end of the channel.

However, the gap 16 also separates the active portion 10 of the reactor on a plane passing through the region of greatest neutron flux. As a result, the neutron reproduction ratio has been appreciably reduced. This is best illustrated by the graph in Figure 6 which shows the decrease in the excess reactivity of the reactor for different width gaps. In order to overcome the decrease in the neutron reproduction ratio caused by the gap at the center of the reactor, it is necessary to increase the physical dimensions of the reactor, as shown in Figure 6.

The man skilled in the art will readily devise many other applications and embodiments of the present invention from a reading of the foregoing specification. For instance, it is clear that the invention is not limited to air cooled neutronic reactors, but could equally well be applied to water cooled or other types of cooled reactors. For this reason, it is intended that the scope of the present invention be limited only by the following claim, and not by the specific disclosure.

What is claimed is:

A neutronic reactor comprising, in combination, a pair of equally dimensioned rectangular graphite blocks confronting each other and forming a cube, said blocks being separated by a gap of approximately 7 centimeters and being provided with 463 annular channels approximately 5.6 square inches in cross section extending from the gap through each of the graphite blocks, the channels within the reactor being spaced by approximately 8 inches in a rectangular lattice, the graphite blocks together forming a cube of approximately 25 feet on a side, a plurality of fuel elements containing cylinders of uranium having a diameter of 1.1 inches and jackets of aluminum, the ratio of the volume of aluminum to the volume of uranium in the active portion of the reactor being approximately 0.2, the 463 cooling channels nearest the center of each of the graphite cubes containing fuel elements containing a total of 37.2 metric tons of uranium, means for introducing air into the gap between the graphite blocks, and means to exhaust the air from the ends of the channels opposite to the gap.

References Cited in the file of this patent
UNITED STATES PATENTS 2,708,656     Fermi et al. _____ May 17, 1955

OTHER REFERENCES

Nucleonics, February 1950, pages 54–60, an article by Ohlinger.

Atomics, February 1951, pages 51–56, an article on "Gleep."

Atomics, June 1951, pages 176–180, an article on "Bepo."

U.S. Atomic Energy Commission, BNL–152, January 1952, I. Kaplan and J. Chernick, pages 6–8, 37, 38, 40, 41, 42, 45, 46, 47, 48, 76, 78, 79. Available from Technical Information Service, Oak Ridge, Tenn.

"Principles of Nuclear Reactor Engineering," by Samuel Glasstone, D. Van Nostrand Co., New York, N.Y., July 1955, pages 797–800.